United States Patent [19]

Odell

[11] 4,369,673
[45] Jan. 25, 1983

[54] MECHANICAL TORQUE CONVERTER

[76] Inventor: Eugene I. Odell, c/o Dept. of Mechanical Engineering, Univ. of South Alabama, Mobile, Ala. 36688

[21] Appl. No.: 163,227

[22] Filed: Jun. 26, 1980

[51] Int. Cl.$^3$ .................. F16H 3/74; F16H 37/06; F16H 15/50
[52] U.S. Cl. ....................... 74/751; 74/198; 74/674; 74/796; 74/5 R
[58] Field of Search ............... 74/751, 198, 190, 199, 74/5 R, 665 A, 665 D, 665 E, 674, 793, 796

[56] References Cited

U.S. PATENT DOCUMENTS

| | | | |
|---|---|---|---|
| 1,622,217 | 3/1927 | Barbier | 74/64 |
| 1,886,823 | 11/1932 | Manville | 74/710 |
| 1,966,357 | 7/1934 | Palmer | 74/259 |
| 1,992,457 | 2/1935 | Anderson, Jr. | 74/751 |
| 2,052,507 | 8/1936 | Walton | 74/751 |
| 2,960,889 | 11/1960 | Keyser | 74/751 |
| 3,153,353 | 10/1964 | Voigt | 74/751 |
| 3,394,619 | 7/1968 | Preston | 74/751 |
| 3,439,561 | 4/1969 | Preston | 74/751 |
| 3,495,479 | 2/1970 | Rass | 74/751 |

FOREIGN PATENT DOCUMENTS

| | | | |
|---|---|---|---|
| 488057 | 8/1975 | Australia | 74/198 |
| 695671 | 8/1953 | United Kingdom | 74/751 |

OTHER PUBLICATIONS

A.P.C. Application of Zanarini, Ser. No. 392,983, Published 5-1943.

*Primary Examiner*—Leslie A. Braun
*Assistant Examiner*—Lawrence J. Gotts
*Attorney, Agent, or Firm*—Newton, Hopkins & Ormsby

[57] ABSTRACT

A gyroscopic traction drive assembly comprises a rotatable frame which carries a rotatable traction input member and a rotatable traction output member. The input and output members frictionally engage a spherical gyroscopic mass at respective points thereon which lie in a common plane which is perpendicular to the axis of rotation of the frame. Rotation of the frame causes the mass to rotate about a first axis passing through its center and perpendicular to the common plane and a second angular velocity is also imparted to the mass about a second axis, due to the frictional contact with the traction input member, which second axis is orthogonal to the first axis and lies in the common plane. These combined motions produce a gyroscopic output torque about a third axis, orthogonal to the first and second axes, which is imparted to the traction output member. This output torque is independent of the output speed of the device and is dependent upon the angular velocities of the mass about the first and second axes as effected by the frame rotation and motion imparted by the traction input member.

20 Claims, 3 Drawing Figures

MECHANICAL TORQUE CONVERTER

BACKGROUND OF THE INVENTION

Drive assemblies which utilize precessional torque of a gyroscopic mass are found in U.S. Pat. No. 3,495,479 of Feb. 17, 1970 to Rass and in U.S. Pat. No. 3,394,619 of July 30, 1968 to Preston. Both of these assemblies are rather complex and are difficult and expensive to implement. In Rass, the precessional torque is coupled out through a spring washer 66 which resists rotation of the flywheel element 61. The output torque is dependent upon the rotational speed of the input shaft. In Preston, a highly complex arrangement is employed in which cyclic coupling out of the torque is achieved.

BRIEF SUMMARY OF THE INVENTION

The invention is directed to a gyroscopic traction drive assembly in which a spherical gyroscopic mass is caused to rotate about first and second orthogonal axes by input means which comprises a frame and a traction input member carried thereby. This combined motion causes the mass to develop gyroscopic output torque about a third orthogonal axis and this torque is imposed upon a traction output member also carried by the frame. In a preferred embodiment, the input axis of the frame and of a shaft connected with the traction input member and the axis of an output shaft connected to the traction output member are coaxial.

An important feature of the invention resides in an assembly as described above wherein the output torque is a function of the difference in angular velocities of the mass about the first and second axes and is independent of the angular velocity of the output.

Stated otherwise, the drive assembly produces an output torque independent of the output speed, although it is to be understood that the magnitude of the output torque can be controlled by controlling the aforesaid difference in input angular velocities.

To provide maximum control over the output torque, separate variable speed drive inputs may be provided for the aforesaid combined motions.

In a particularly simple and economical construction, the axes of the two drive inputs and of the output are coaxial, with the mass being orbited by a frame which also mounts the input and output traction.

DETAILED DESCRIPTION OF THE INVENTION

Figure 1:
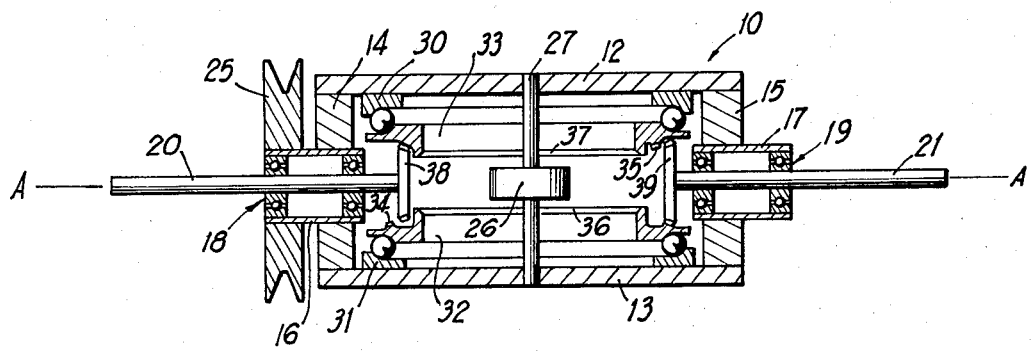
FIG. 1 is a longitudinal section of a drive assembly constructed according to this invention.
Figure 2:
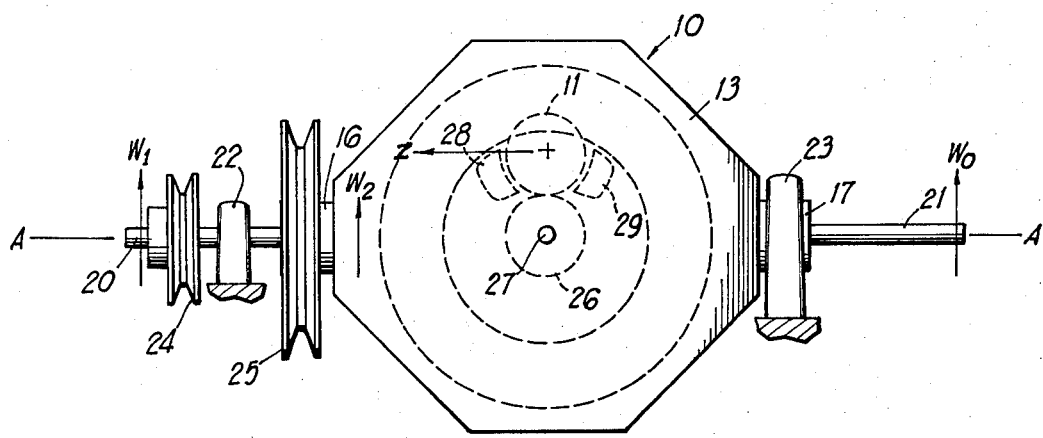
FIG. 2 is a side elevational view of the assembly of FIG. 1.
Figure 3:
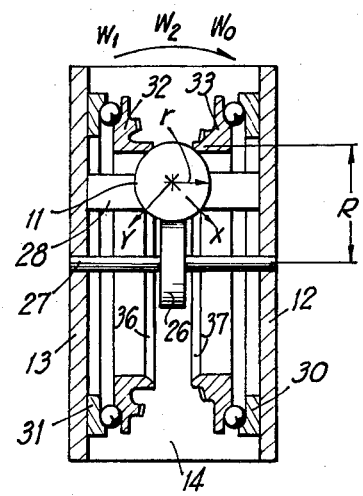
FIG. 3 is a transverse section of the assembly shown in FIG. 1.

In the embodiment shown in FIGS. 1–3, the drive assembly comprises a suitable frame 10 which carries and locates a spherical gyroscopic mass 11. The frame may of course be constructed in any desired fashion but for the purpose of illustration, comprises a pair of opposite side plates 12 and 13 rigidly joined by opposite end members 14 and 15. The end members are provided with respective sleeves 16 and 17 which house the illustrated bearings 18 and 19 which receive the shafts 20 and 21 lying along the common axis A—A. As is illustrated in FIG. 2, the frame is rotatably supported about the input axis A—A by means of suitable bearing blocks 22 and 23, the former of which supports the input shaft 20 and the latter of which supports the frame 10 directly through the sleeve 17.

Drive input may be imparted to the input shaft 20 by suitable means such as the pulley 24 whereas drive input rotation is imparted to the frame 10 by suitable means such as the pulley 25 on the sleeve 16.

The frame mounts a freely rotatable roller 26 by means of the cross shaft 27 which, in conjunction with the two locating members 28 and 29 and the traction members hereinafter described, positively locate the ball or mass 11 in offset relation to the axis A—A so that, as the frame rotates, the mass orbits along a path centered on the axis A—A and contained within a plane perpendicular thereto.

As shown in FIG. 3 for the member 28, the two members bridge between and are affixed to the side plates 12 and 13. Also fixed to the side plates are the annular bearing race members 30 and 31 which locate the respective traction output and input members 32 and 33. These two members are of annular form and have respective bevel gears 34 and 35 formed thereon and each is provided with an internal, bevelled end edge to define the torispherical traction surfaces 36 and 37. These traction surfaces engage and bear upon the mass 11 essentially with point contact and the mass 11 correspondingly is forced into essentially point contact with the roller 26. The two locating members 28 and 29 may be positioned to allow slight angular movement of the mass 11 about the axis of the roller 26.

The input shaft 20 is provided with a bevel gear 38 in mesh with bevel gear 35 whereas the output shaft 21 is provided with a bevel gear 39 in mesh with bevel gear 34 as shown in FIG. 1. Thus, whereas rotation of the frame 10 carries the mass 11 along the orbital path centered on the axis A—A and, in particular, at the point of intersection of the axis A—A and the transverse axis of the roller 26, the input shaft 20 imparts rotation to the input traction element 33. The rotation of the member 33, as can best be seen in FIG. 3, causes by virtue of its contact point with the mass 11 a rotation of that mass about the illustrated x axis, i.e., that axis passing through the center of the spherical mass 11 prependicular to the y axis passing through the center and the contact point between the base and the traction surface 37. It will be appreciated that whereas rotational drive input must be imparted to the frame 10, the shaft 20 can be stationary or it can be rotated.

In any event, the combined input motions imparted to the mass, namely, the axis A—A motion which is at the angular velocity $\omega_2$ of the frame 10 and the rotation of the mass 11 about the x axis cause precessional motion of the mass about the orthogonal y axis (FIG. 3). This precessional movement therefore develops gyroscopic output torque about the y axis and, correspondingly, of the output shaft 21, which may rotate at the angular rate $\omega_o$. Using the notation $N_1$ and $N_2$ for the number of teeth of the respective gears 38 and 35 and $\omega_1$ for the angular velocity of the input shaft 20, the angular velocity of the mass 11 about the x axis is:

$$\omega_x = \frac{N_1 R}{N_2 r} (\omega_2 - \omega_1) \text{ rad/sec}$$

where r is the radius of the mass 11 and R is the radius of the traction surface (FIG. 3).

Similarly, the angular velocity of the sphere 11 about the y axis is:

$$\omega_y = \frac{N_4 R}{N_3 r} (\omega_o - \omega_2) \text{ rad/sec}$$

where $N_4$ and $N_3$ are the notations for the numbers of gear teeth of the gears 39 and 34 respectively.

The angular velocity of the mass 11 about the z axis (FIG. 2) is, as stated before:

$$\omega_z = \omega_2$$

Since the complete motion of the ball is known, as above, the angular momentum and time rate of change of angular momentum of the spherical mass or ball 11 can be computed. Setting the time rate of change of the angular momentum equal to the moments that must be applied to the mass shows the output torque at the shaft 21 to be:

$$T_o = \frac{I N_1 N_4 R^2}{N_2 N_3 r^2} \omega_2(\omega_1 - \omega_2)$$

where I is the mass moment of inertia of the ball 11.
Since $$\omega_2 = \omega_z \text{ and } (\omega_1 - \omega_2) = -\frac{N_2 r}{N_1 R} \omega_x,$$

by substitution, the output torque expressed in terms of motion of the ball can be expressed:

$$T_o = -I \frac{N_4 R}{N_3 r} \omega_x \omega_z,$$

which illustrates that the ball must possess motions about its x and z axes in order to produce an output torque. Since the motion $\omega_x$ is a function of $(\omega_2 - \omega_1)$ and since $\omega_z = \omega_2$, it is evident that in order to produce an output torque, rotary motion $\omega_2$ must be imparted to the frame while the other input motion $\omega_1$ may take any value, including zero, except that value where $(\omega_2 - \omega_1)$ is equal to zero.

This output torque is of course limited by the maximum allowable normal force F and Hertz stress on the ball at the traction points and by the coefficient of traction $\mu$ as follows:

$$T\text{max} = \mu F R \frac{N_4}{N_3}.$$

As will be seen for the above equation for $T_o$, the output torque is wholly independent of the rotational speed of the output shaft 21 and can be controlled quite simply by variation in either one or both of the input speeds $\omega_1$ and $\omega_2$.

It will be appreciated from the above that it is not essential that the gyroscopic mass be located, relative to axis A—A, such that the mass follows an orbital path, but that the center of the mass may, if desired, lie on such axis A—A. However, the most simple and straightforward arrangement is perhaps best realized by locating the mass center in offset relation to the axis A—A as shown in FIGS. 1–3.

What is claimed is:

1. A gyroscopic traction drive assembly comprising, in combination:
   a frame, a spherical gryroscopic mass carried by said frame and means for rotating said frame about a fixed axis whereby said mass is caused to rotate at an angular velocity $\omega_z$ about a first axis passing through the center of said mass;
   traction input means and traction output means rotatably carried by said frame for engaging said gyroscopic mass at respective contact points which lie in a plane orthogonal to said fixed axis and which define, with the center of the mass, respective axes y and x which are orthogonal to each other;
   means carried by said frame for positively locating said gyroscopic mass in fixed relation to said frame such that the center of said mass and said respective contact points remain in said plane and including roller means for engaging said mass at a third contact point lying in said plane to force said mass to bear upon said traction input and traction output means at said respective contact points;
   means for causing said traction input means to impart to said mass an angular velocity $\omega_x$ about said x axis whereby said gyroscopic mass is caused to process at an angular velocity $\omega_y$ about said y axis; and
   said roller means causing said mass to bear upon said traction input and traction output means at said respective contact points with sufficient force such that said angular velocity $\omega_y$ imparts an output torque to said traction output means which is independent of the rotational speed of such traction output means.

2. A gyroscopic traction drive assembly comprising, in combination:
   a frame and means for rotating said frame about an input axis;
   a spherical gyroscopic mass located by said frame and traction input means rotatably carried by said frame and engaging said mass at a point thereon lying in a plane containing the center of said mass and which is transverse to said input axis, whereby said mass is caused to rotate about first and second orthogonal axes passing through its center, while developing gyroscopic output torque about a third axis orthogonal to said first and second axes;
   a traction output member rotatably carried by said frame and engaging said mass to receive the output torque developed about said third axis; and
   output means drivingly engaged by said traction output member for receiving said output torque about an output axis which is coaxial with said input axis whereby to provide an in-line gyroscopic traction drive in which the output torque is independent of the output speed of said output means.

3. A gyroscopic traction drive assembly as defined in claim 2 wherein said first axis is parallel to but offset from said input axis.

4. A gyroscopic traction drive assembly comprising, in combination:
   a frame, means for rotatably supporting said frame about an input axis, and drive input means for rotating said frame about said input axis;
   a spherical gyroscopic mass carried by said frame whereby said mass is rotated with the same angular velocity of said frame;
   rotatable traction input means engaging said mass for imparting angular velocity thereto about a first axis lying within a plane perpendicular to said input axis whereby the combined angular velocities of said mass cause said mass to produce a gyroscopic output torque about a second axis lying within said plane and perpendicular to said first axis; and rotatable output traction means engaging said mass for receiving said gyroscopic output torque.

5. A drive assembly as defined in claim 4 including an output shaft rotatably mounted in said frame coaxially with said input axis, said output shaft being driven by said output traction means.

6. A drive assembly as defined in claim 5 including a further shaft coaxial with said output shaft and in drive engagement with said input traction means whereby the angular velocity of said mass is a function of the rotational speed difference between said frame and said input traction means.

7. A drive assembly as defined in claim 6 wherein said traction input means comprises a bevel gear member rotatable within said frame about a transverse axis and having a torispherical traction surface engaging said mass.

8. A drive assembly as defined in any one of claims 4–7 wherein said output traction means comprises a bevel gear member rotatable within said frame about a transverse axis and having a torispherical traction surface engaging said mass.

9. A drive assembly as defined in either one of claims 4 or 5 wherein said traction input means comprises a bevel gear member rotatable within said frame about a transverse axis and having an torispherical traction surface engaging said mass.

10. A gyroscopic traction drive assembly comprising, in combination:

a spherical gyroscopic mass;

input means for causing said mass to rotate at respective angular velocities $\omega_z$ and $\omega_x$ about first and second orthogonal axes passing through the center of said mass whereby the mass develops gyroscopic output torque about a third axis orthogonal to said first and second axes, said input means comprising a rotatable frame and a traction input member rotatably carried by said frame and engaging said mass; and output means for receiving the gyroscopic torque developed about said third axis, said output means comprising an output traction member rotatably carried by said frame and engaging said mass.

11. A gyroscopic traction drive assembly as defined in claim 10 wherein said first axis is at least parallel to the rotational axis of said frame and said traction input and traction output members engage said mass at points thereon lying in a common plane containing the center of said mass and which common plane is perpendicular to said first axis, whereby said output torque is a function solely of said angular velocities $\omega_z$ and $\omega_x$ and is thereby independent of the output speed of said output means.

12. A gyroscopic traction drive assembly as defined in claims 10 or 11 wherein said first axis is parallel to but offset from the rotational axis of said frame.

13. A gyroscopic traction drive assembly as defined in claim 12 wherein said traction input and traction output members are rotatable with respect to said frame about respective axes which lie in a common plane containing said second axis.

14. A gyroscopic traction drive assembly as defined in claims 10 or 11 wherein said traction input and traction output members are rotatable with respect to said frame about respective axes which lie in a common plane containing said second axis.

15. A gyroscopic traction drive assembly comprising, in combination:

a frame, means for rotatably supporting said frame about an input axis, and drive means for rotating said frame about said input axis;

an output member and means for rotatably supporting said output member about an output axis;

a spherical gyroscopic mass; and traction means carried by said frame and engaging said mass for imparting output torque to said output member which is independent of the driven speed of said output member.

16. A gyroscopic traction drive assembly as defined in claim 15 wherein said traction means comprises a traction input member and a traction output member each rotatably carried by said frame about an axis lying in a plane perpendicular to said input axis.

17. A gyroscopic traction drive assembly as defined in claim 15 or 16 wherein said input and output axes are coaxial.

18. In a gyroscopic traction drive assembly, the combination of:

a frame and means for rotatably supporting said frame about an input axis, a rotatable traction input member carried by said frame, a rotatable traction output member carried by said frame, and a spherical gyroscopic mass located within said frame and engaged by said traction input and output members at respective points on said mass which lie in a common plane perpendicular to said input axis.

19. In a gyroscopic traction drive assembly as defined in claim 18 wherein said traction input member and said traction output member are rotatably mounted in said frame about axes which are coaxial and lie in said common plane.

20. In a gyroscopic traction device as defined in claim 2 or 19 including a drive input shaft coaxial with said input axis and drivingly connected with said traction input member, and a drive output shaft coaxial with said input axis and drivingly connected with said traction output member.

* * * * *